(12) United States Patent
Dzik

(10) Patent No.: US 10,045,032 B2
(45) Date of Patent: Aug. 7, 2018

(54) EFFICIENT REGION OF INTEREST DETECTION

(71) Applicant: Intel Corporation, Santa Clara, CA (US)

(72) Inventor: Dariusz Dzik, Allentown, PA (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 13/748,879

(22) Filed: Jan. 24, 2013

(65) Prior Publication Data

US 2014/0204995 A1 Jul. 24, 2014

(51) Int. Cl.
| | |
|---|---|
| *G06K 9/46* | (2006.01) |
| *H04N 19/17* | (2014.01) |
| *H04N 19/119* | (2014.01) |
| *H04N 19/14* | (2014.01) |
| *H04N 19/167* | (2014.01) |
| *H04N 19/196* | (2014.01) |
| *H04N 19/115* | (2014.01) |

(52) U.S. Cl.
CPC .......... *H04N 19/17* (2014.11); *H04N 19/119* (2014.11); *H04N 19/14* (2014.11); *H04N 19/167* (2014.11); *H04N 19/198* (2014.11); *H04N 19/115* (2014.11)

(58) Field of Classification Search
CPC .......... H04N 19/00133; H04N 19/115; H04N 19/119; H04N 19/14; H04N 19/167; H04N 19/17; H04N 19/198
USPC .................................................... 375/240.02
See application file for complete search history.

(56) References Cited

U.S. PATENT DOCUMENTS

| | | | |
|---|---|---|---|
| 6,870,883 B2 | 3/2005 | Iwata | |
| 8,019,170 B2* | 9/2011 | Wang | G06K 9/00234 348/404.1 |
| 8,041,132 B2 | 10/2011 | Yan | |
| 8,208,758 B2 | 6/2012 | Wang et al. | 382/282 |
| 8,270,496 B2 | 9/2012 | Yin et al. | 375/240.26 |
| 2002/0094031 A1 | 7/2002 | Ngai et al. | |
| 2004/0091158 A1* | 5/2004 | Miled | G06T 7/206 382/236 |
| 2005/0008075 A1 | 1/2005 | Chang | 375/240.03 |
| 2006/0045381 A1* | 3/2006 | Matsuo et al. | 382/276 |
| 2006/0128326 A1* | 6/2006 | Pietraski | 455/130 |

(Continued)

OTHER PUBLICATIONS

Patrick Wong et al, Tracking Table tennis balls in real match scenes for umpiring applications, 2011, Sciencedomain.org.*

(Continued)

*Primary Examiner* — Jorge L Ortiz Criado
*Assistant Examiner* — Yong Joon Kwon
(74) *Attorney, Agent, or Firm* — Green, Howard & Mughal LLP

(57) ABSTRACT

An apparatus having a circuit. The circuit may be configured to (i) calculate a plurality of complexity values while compressing a current picture in a video signal. Each complexity value generally characterizes how a corresponding one of a plurality of blocks in the current picture was compressed. The circuit may also be configured to (ii) adjust the complexity values below a first threshold to a default value and (iii) generate a region of interest by grouping the blocks having non-default values of the complexity values above a second threshold.

17 Claims, 7 Drawing Sheets

(56) References Cited

U.S. PATENT DOCUMENTS

| | | | |
|---|---|---|---|
| 2006/0204113 A1* | 9/2006 | Wang | H04N 19/147 382/236 |
| 2006/0215753 A1* | 9/2006 | Lee et al. | 375/240.08 |
| 2007/0009045 A1 | 1/2007 | Mohandas | |
| 2007/0086528 A1 | 4/2007 | Mauchly et al. | |
| 2007/0189623 A1* | 8/2007 | Ryu | 382/243 |
| 2007/0280349 A1* | 12/2007 | Prieto | H04N 19/124 375/240.03 |
| 2008/0129844 A1* | 6/2008 | Cusack et al. | 348/241 |
| 2008/0225944 A1* | 9/2008 | Pore | H04N 19/61 375/240.03 |
| 2009/0219993 A1* | 9/2009 | Bronstein | H04N 19/61 375/240.03 |
| 2009/0307464 A1 | 12/2009 | Steinberg et al. | |
| 2010/0054329 A1* | 3/2010 | Bronstein et al. | 375/240.03 |
| 2010/0158126 A1 | 6/2010 | Bai et al. | |
| 2010/0183070 A1* | 7/2010 | Lu et al. | 375/240.08 |
| 2010/0246665 A1 | 9/2010 | Brederson | |
| 2010/0296575 A1 | 11/2010 | Lee et al. | |
| 2011/0200273 A1* | 8/2011 | Singhal | G06K 9/3233 382/284 |
| 2011/0235706 A1* | 9/2011 | Demircin | H04N 19/126 375/240.03 |
| 2012/0224629 A1 | 9/2012 | Bhagavathy et al. | 375/240.08 |
| 2013/0003830 A1 | 1/2013 | Misra et al. | |
| 2013/0170559 A1* | 7/2013 | Schink | H04N 19/107 375/240.25 |
| 2013/0208784 A1* | 8/2013 | Pietila | H04N 19/137 375/240.02 |

OTHER PUBLICATIONS

Non-Final Office Action for U.S. Appl. No. 13/692,118 dated Apr. 2, 2015, 7 pages.

Notice of Allowance for U.S. Appl. No. 13/692,118 dated Dec. 3, 2015, 5 pages.

* cited by examiner

EFFICIENT REGION OF INTEREST DETECTION

The present application is related to co-pending U.S. application Ser. No. 13/692,118 filed Dec. 3, 2012, and is hereby incorporated by reference in its entirety.

FIELD OF THE INVENTION

The present invention relates to video encoding generally and, more particularly, to a method and/or apparatus for implementing an efficient region of interest detection.

BACKGROUND OF THE INVENTION

The H.264 Advanced Video Coder (i.e., H.264) standard has introduced a state-of-the-art and high compression efficiency coding technique. High coding performance is made possible by implementing many tools, like flexible block size motion compensation, sub-pixel level motion compensation, bidirectional motion estimation, de-blocking filtering, flexible transforms and efficient entropy coding. The tools commonly consume significant computational power for processors utilized in the video coding.

From a perceptual performance point of view, coding whole images with the same quality is inefficient. A viewer attention model can be taken into consideration to improve an overall quality and/or reduce an output bandwidth for the same quality. From a computational complexity point of view, focusing the encoding on important parts of an image is beneficial. The image parts that receive special attention are called regions of interest (i.e., ROI). A conventional simple technique to detect an ROI uses a fixed area specified by the user. Other common techniques use more computationally complex approaches that involve face detection and edge detection.

It would be desirable to implement an efficient region of interest detection.

SUMMARY OF THE INVENTION

The present invention concerns an apparatus having a circuit. The circuit may be configured to (i) calculate a plurality of complexity values while compressing a current picture in a video signal. Each complexity value generally characterizes how a corresponding one of a plurality of blocks in the current picture was compressed. The circuit may also be configured to (ii) adjust the complexity values below a first threshold to a default value and (iii) generate a region of interest by grouping the blocks having non-default values of the complexity values above a second threshold.

The objects, features and advantages of the present invention include providing an efficient region of interest detection that may (i) have low computational complexity compared with common techniques, (ii) detect the regions of interest based on complexity values of blocks, (iii) provide a coarse detection, (iv) provide a refined detection, (v) implement an H.264 codec and/or (vi) be implemented in one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention provide a technique for an efficient region of interest (e.g., ROI) detection. The technique is generally based on determining computational complexities of blocks (e.g., 16×16 pixel blocks or macroblocks) in a current picture (or frame or field or image) that have just been compressed to determine one or more current ROIs. The current ROI may subsequently be superimposed on a next unencoded picture. The next picture may be compressed and encoded using the superimposed ROI to allocated higher bit rates inside the ROI and lower bit rates outside the ROI.

Image areas that generally attract attention of a viewer are often observed to be areas with the most motion, the most texture details and/or are usually closer to a center of the pictures. Such areas often correlate with computationally intensive blocks (or macroblocks) in the pictures. Therefore, the encoding computational complexity of the blocks generally provides a reasonable starting point to determine the ROI. As a result, some embodiments of the technique may have low computational complexity compared with common ROI detection techniques (e.g., at least 500 times faster compared with existing pixel processing methods). Since the technique generally uses complexity data from one picture to determine a ROI for another picture, high motion scenes (e.g., sport and action scenes) may include motion adjustments when determining the ROI.

Figure 1:
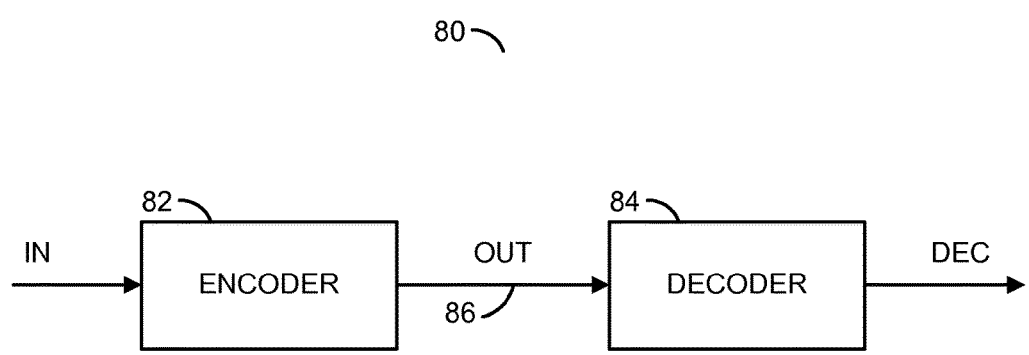
FIG. 1 is a block diagram of an example video system.

Referring to FIG. 1, a block diagram of an example video system 80 is shown. The system 80 may implement a video encoder/decoder system. The system 80 generally comprises a block (or circuit) 82, a block (or circuit) 84 and a medium (or link) 86. An input signal (e.g., IN) is received by the circuit 82. An output signal (e.g., OUT) is generated by the circuit 82 and transferred to the circuit 84 via the medium 86. The circuit 84 may generate and present a decoded signal (e.g., DEC).

The signal IN generally carries uncompressed and unencoded video. The signal IN may be one or more analog video signals and/or one or more digital video signals. The signal IN generally comprises a sequence of progressive-format frames and/or interlace-format fields. The signal IN may include synchronization signals suitable for synchronizing the video information. The signal IN may be presented in analog form as, but not limited to, an RGB (Red, Green, Blue) signal, an EIA-770 (e.g., YCrCb) signal, an S-video signal and/or a Composite Video Baseband Signal (CUBS). In digital form, the signal IN may be presented as, but is not limited to, a High Definition. Multimedia Interface (HDMI) signal, a Digital Video Interface (DVI) signal and/or a BT.656 signal. The signal IN may be formatted as a standard definition signal or a high definition signal.

The signal OUT conveys compressed and encoded video. The signal OUT may be a compressed and encoded digital video signal, generally referred to as a bitstream. The signal OUT may comprise a sequence of progressive-format frames and/or interlace-format fields. The signal OUT may be compliant with a VC-1, MPEG and/or H.26x standard. The MPEG/H.26x standards generally include H.263, H.264, MPEG-1, MPEG-2 and MPEG-4. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The signal DEC may carry uncompressed and unencoded video, similar to that in the signal IN. The signal. DEC may be one or more analog video signals and/or one or more digital video signals. The signal DEC generally comprises a sequence of progressive-format frames and/or interlace-format fields. The signal DEC may include synchronization signals suitable for synchronizing the video information. The signal DEC may be presented in analog form as, but not limited to, an RGB (Red, Green, Blue) signal, an EIA-770 (e.g., YCrCb) signal, an S-video signal and/or a Composite Video Baseband Signal (CVBS). In digital form, the signal DEC may be presented as, but is not limited to, a High Definition Multimedia Interface (HDMI) signal, a Digital Video Interface (DVI) signal and/or a BT.656 signal. The signal DEC may be formatted as a standard definition signal or a high definition signal.

The circuit 82 generally implements a video encoder circuit. The circuit 82 is operational to compress and encode the raw video received in the signal IN. The compressed and encoded video is presented in the signal OUT. The compression and encoding may be compliant with the H.264 codec standard. Other video code standards may be implemented to meet the criteria of a particular application.

The circuit 84 generally implements a video decoder circuit. The circuit 84 is operational to decode and decompress the video data received in the signal OUT. The decoded and decompressed video is presented in the signal DEC. The decoding and decompression may be compliant with the H.264 codec standard. Other video code standards may be implemented to meet the criteria of a particular application.

The medium 86 generally implements one or more transmission media and/or one or more storage media. The medium 86 is operational to transfer and/or store the video data in the signal OUT from the circuit 82 to the circuit 84.

Figure 2:
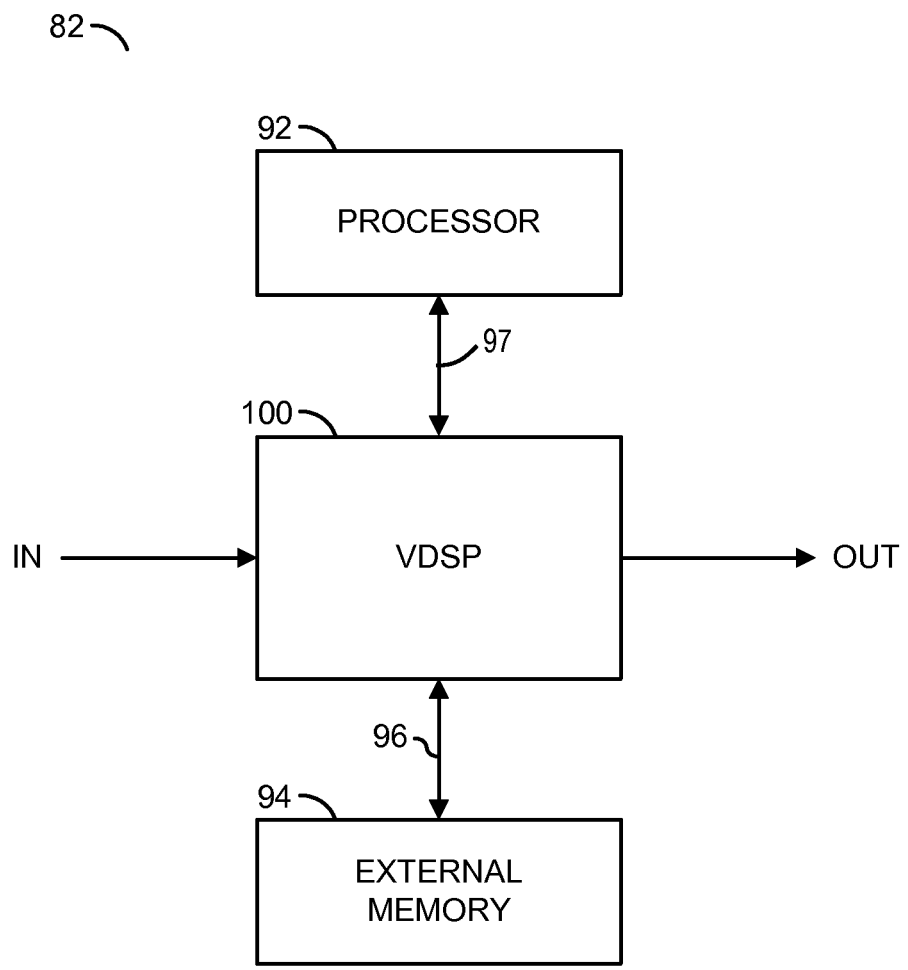
FIG. 2 is a block diagram of an example implementation of an encoder.

Referring to FIG. 2, a block diagram of an example implementation of the circuit 82 is shown. The apparatus (or circuit or device or integrated circuit) 82 may implement a video encoder. The circuit 82 may be configured to implement a low complexity region of interest detection technique. The apparatus generally comprises a block (or circuit) 92, a block (or circuit) 94, a bus (or circuit) 96 and a block (or circuit) 100. The circuits 92-100 may represent modules and/or blocks that may be implemented as hardware, software, a combination of hardware and software, or other implementations.

The circuit 100 may be directly coupled with the circuit 92 to exchange data and control information, as represented FIG. 2 by line 97. The circuit 100 may be coupled with the circuit 94 to exchange data. An input signal (e.g., IN) may be received by the circuit 100. An output bitstream signal (e.g., OUT) may be presented by the circuit 100.

The circuit 92 generally implements as a processor. The circuit 92 is operational to perform select digital video encoding operations. The encoding may be compatible with the VC-1, MPEG or H.26x standards. The circuit 92 may also be operational to control the circuit 100. In some embodiments, the circuit 92 implements a SPARC processor. In other embodiments, the circuit 92 implements an ARM processor. Other types of processors may be implemented to meet the criteria of a particular application. The circuit 92 is typically fabricated as an integrated circuit in (on) a single chip (or die).

The circuit 94 may be implemented as a dynamic random access memory (e.g., DRAM). The circuit 94 may be operational to store or buffer large amounts of information consumed and generated by the encoding operations of the apparatus 90. As such, the circuit 94 may be referred to as a main (or external) memory. The circuit 94 may be implemented as a double data rate (e.g., DDR) memory. Other memory technologies may be implemented to meet the criteria of a particular application. The circuit 94 may be fabricated as an integrated circuit in (on) a single chip (or die). In some embodiments, the circuits 92 and 94 may be fabricated in (on) separate chips.

The circuit 96 may implement a memory bus. The bus 96 is generally operational to carry data, addresses and commands between the circuit 100 and the circuit 94. The bus 96 generally includes a data bus having a width of multiple bits (e.g., 128 bits).

The circuit 100 may be implemented as a video digital signal processor (e.g., VDSP) circuit. The circuit 100 may be operational to perform additional digital video encoding operations. The circuit 100 may be controlled by the circuit 92. The circuit 100 generally comprises multiple digital signal processors (or cores).

Compressing and encoding operations performed by the circuit 100 may include, but are not limited to the following. While compressing and encoding a sequence of pictures received via the signal IN, the circuit 100 may calculate a plurality of complexity values while compressing a current picture in the video signal IN. Each complexity value generally characterizes how a corresponding block in the current picture was compressed. The circuit 100 may also adjust the complexity values below a discrimination threshold to a default value. A region of interest may subsequently be generated by grouping the blocks having non-default complexity values above a decision threshold. The region of interest may be superimposed on a next picture in the signal IN. The circuit 100 may compress the next picture with a higher bit rate inside the region of interest than the bit rate outside of the region of interest. While compressing the next picture, the circuit 100 may calculate and save a new set of complexity values to be used to generate the next region of interest for a subsequent picture. When decoded and decompressed by the circuit 84, the resulting pictures in the signal DEC may have a better quality inside the ROI than outside the ROI.

The circuit 100 may be fabricated as an integrated circuit in (on) a single chip (or die). In some embodiments, the circuits 92 and 100 may be fabricated in (on) the same chip. In other embodiments, the circuits 92 and 100 may be fabricated in (on) separate chips.

Figure 3:
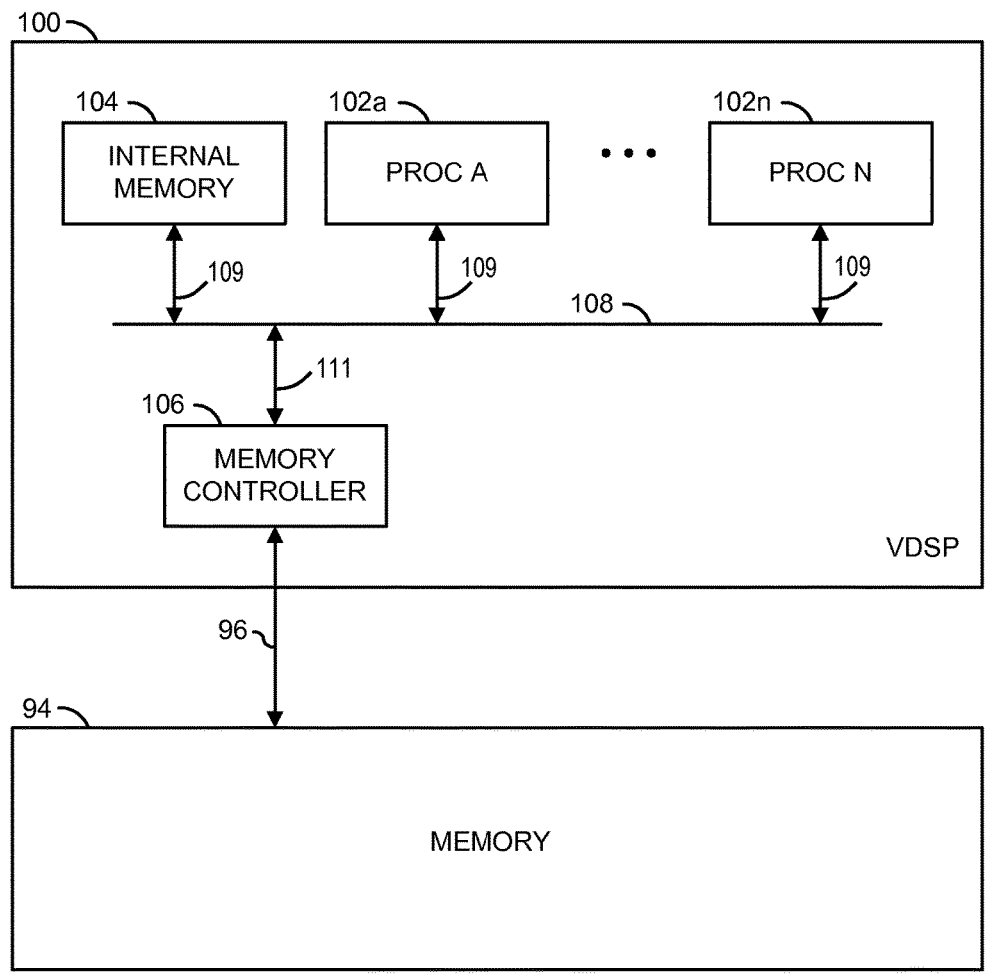
FIG. 3 is a detailed block diagram of a video digital signal processor.

Referring to FIG. 3, a detailed block diagram of the circuit 100 is shown. The circuit 100 generally comprises multiple blocks (or circuits) 102a-102n, a block (or circuit) 104, a block (or circuit) 106 and a bus (or circuit) 108. The circuits 102a-108 may represent modules and/or blocks that may be implemented as hardware, software, a combination of hardware and software, or other implementations.

The circuit 106 may be bidirectionally coupled to the circuit 94 via the bus 96. The circuits 102a-102n may be bidirectionally coupled to the circuit 106 via the bus 108, as represented in FIG. 3 by lines 109. The circuit 104 may be bidirectionally coupled to the circuits 106 and 102a-102n via the bus 108, as represented in FIG. 3 by line 111.

Each circuit 102a-102n may implement a core processor circuit. The circuits 102a-102n are generally operational to execute a plurality of program instructions (e.g., software programs). The programs may include, but are not limited to, a region of interest detection process, a compression process, an entropy encoding process and a decompression process. The compression process may include, but is not limited to, a control process, a motion estimation process, a motion compensation process, an intra-prediction process, a forward transform process, a quantization process, a complexity computational process and a slice partitioning process. The decompression process may include, but is not limited to, an inverse quantization process, an inverse transform process and a filter process.

The circuit 104 may implement an internal memory circuit. The circuit 104 may be operational to store reference samples and the current block samples used in the motion compensations. The circuit 104 may be utilized by the circuits 102a-102n as a local storage for rapid access to the reference samples and the current block samples.

The circuit 106 may implement a memory controller circuit. The circuit 106 is generally operational to control access of the circuit 94 by the circuits 102a-102n and/or the circuit 92.

The circuit 108 may implement an internal bus. The bus 106 may be operational to transfer data, samples, commands and other information between the circuits 102a-102n, 104 and 106.

Figure 4:
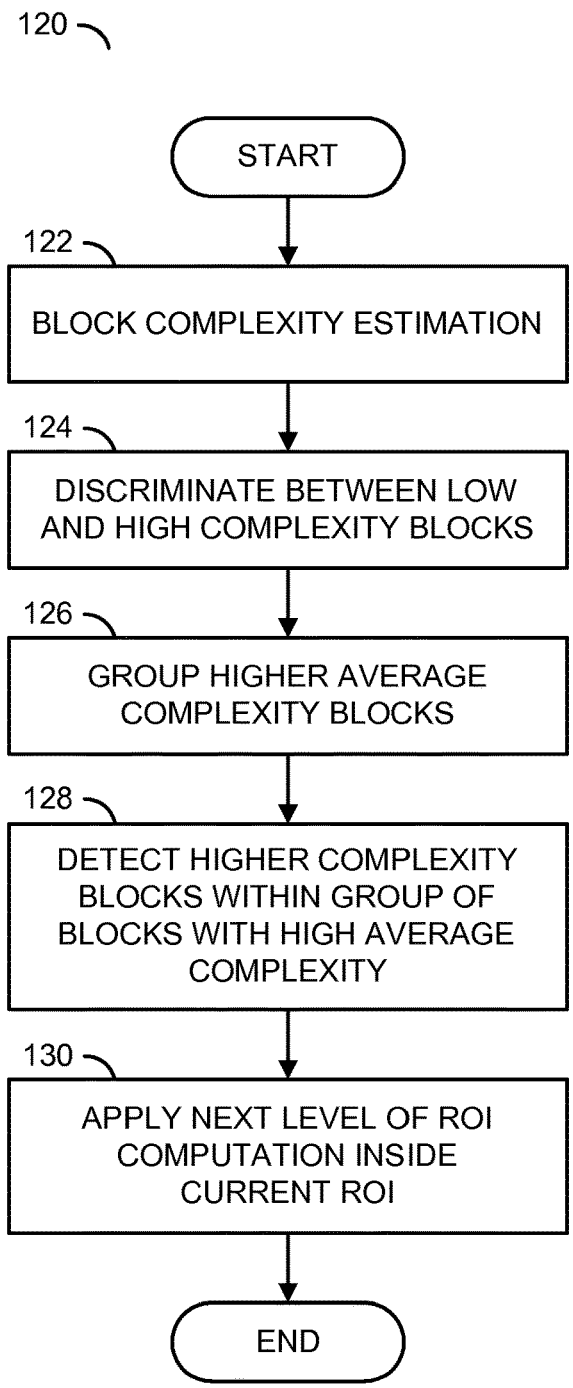
FIG. 4 is a flow diagram of an example method for detecting a region of interest in accordance with an embodiment of the present invention.

Referring to FIG. 4, a flow diagram of an example method 120 for detecting a region of interest is shown in accordance with an embodiment of the present invention. The method (or process or technique) 120 may be implemented by the circuit 100. In some embodiments, the method 120 may be implemented by (i) one or more circuits 102a-102n performing pre-preprocessing operations on the video in the signal IN and (ii) the other circuits 102a-102n performing compression and encoding operations on the resulting preprocessed video. The method 120 generally comprises a step (or state) 122, a step (or state) 124, a step (or state) 126, a step (or state) 128 and a step (or state) 130. The steps 122-130 may represent modules and/or blocks that may be implemented as hardware, software, a combination of hardware and software, or other implementations.

Figure 5:
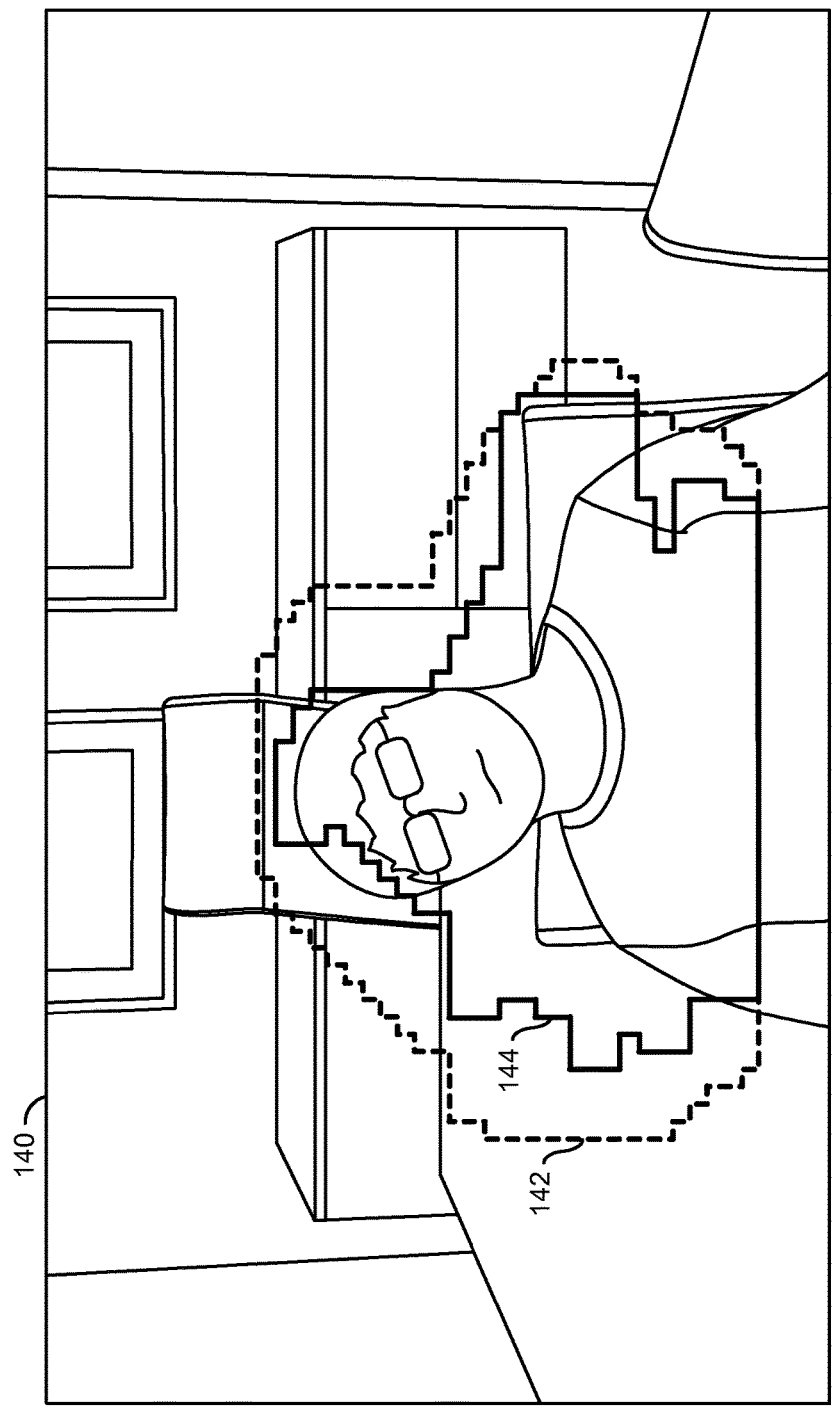
FIG. 5 is a diagram of an example picture.

Referring to FIG. 5, a diagram of an example picture 140 is shown. Within the picture 140 is illustrated an initial detected region of interest 142 and an adjusted region of interest 144.

In the step 122 of FIG. 4, the circuit 100 (e.g., the circuits 102b-102d performing the compression operations) may calculate the computational complexity values of multiple blocks by compressing a current picture (e.g., the picture 140) received via the signal IN. Each complexity value generally corresponds to one of the multiple blocks (or luma blocks, chroma block or macroblocks) in the current picture. The complexity values may be extracted using hardware, run-time operating system timers, and/or by using a complexity estimation process. An example of a complexity estimation process may be found in co-pending U.S. application Ser. No. 13/692,118, which is hereby incorporated by reference in its entirety.

Low complexity blocks may be eliminated in the step 124 by the circuit 100 (e.g., the circuit 102a performing the preprocessing operations on a next picture). A discrimination threshold may be used to discriminate among the blocks having high complexity values and the blocks having low complexity values. One or more blocks having complexity values above the discrimination threshold may be marked as candidates to include in the region of interest. The remaining blocks having complexity values below the discrimination threshold may be marked as non-region of interest blocks.

In some cases, the discrimination threshold may be an average of the complexity values calculated for the current picture in the step 122. In other cases, the discrimination threshold may be calculated as a value between a maximum complexity value and the average block complexity value. Practical implementations generally indicate that the maximum complexity value divided by a small number (e.g., between approximately 3 to 5) produce better results than using the average complexity value.

The circuit 100 (e.g., the circuit 102a) may create one or more initial regions of interest (e.g., ROI 142) by grouping some to all of the high complex blocks in the step 126 based on a decision threshold. The decision threshold is generally calculated as an average of the complexity values received from the step 124 that are not at the default value (e.g., have non-zero values). The blocks with complexity values above the decision threshold may be included in the initial ROI. The blocks with complexity values below the decision threshold may be treated as non-ROI blocks. For pictures without a clear initial ROI, the decision threshold may be increased and the detection process repeated to avoid large picture areas from being detected as part of an initial ROI.

To fill small "holes" in the ROI, the step 126 may add to the ROI the Q×P adjacent blocks around each block already marked as part of ROI. For a picture size of 720 progressive lines (e.g., 1280×720 pixels), the value of Q may range from approximately 2 to 4 adjacent blocks and the value of P may range from approximately 2 to 4 adjacent blocks. Other values of Q and P may be implemented to meet the criteria of a particular application.

A "flatness" of the current picture may be calculated by the circuit 100 as a ratio between a maximum complexity and the average complexity. If the ratio is low (e.g., from 2:1 to 4:1), the entire current picture may have similar complexity (e.g., the current picture is flat). If the ratio is high (e.g., greater than 4:1), the part or parts of current picture with much higher complexity may be designated as the ROI(s).

In the optional step 128, the circuit 100 may adjust the initial ROI to generate an adjusted ROI. The complexity values of the blocks within the initial ROI may be examined and compared with the complexity values of the neighboring blocks already grouped into the initial ROI. The comparisons may identify the higher complexity blocks within the initial ROI. Using the results of the comparisons, the circuit 100 may move a boundary of the initial ROI inward toward the higher complexity blocks. A new ROI (e.g., the adjusted ROI 144) may be created inside the initial ROI. The blocks within the initial ROI 142 but outside the new ROI may be marked as non-ROI blocks.

The circuit 100 (e.g., the circuit 102e) may apply another level of ROI computations to further refine the region of interest prior to the compression operation. The refined ROI computations may be applied to the next picture with the initial ROI or the adjusted ROI overlaid (or superimposed) onto the next one or more pictures. In the optional step 130, the circuit 100 may execute a standard or proprietary ROI detection technique to the areas inside the overlaid ROI. Using a multi-step ROI approach may reduce the computational complexity compared with applying the refined ROI detection technique to whole pictures.

Once a final ROI (e.g., the initial, adjusted or refined ROI) has been established, the circuit 100 (e.g., the circuit 102a) may store the final ROI in the memory 94 and/or the memory 104. The circuit 100 (e.g., the circuits 102b-102d) may subsequently compress and encode the next picture. The compression may allocate a higher bit rate to the content inside the final ROI compared with the content outside the final ROI. In some situations, the higher bit rate within the ROI and a lower bit rate outside the ROI may be adjusted relative to each other to produce an approximately constant bit rate for the pictures.

Figure 6:
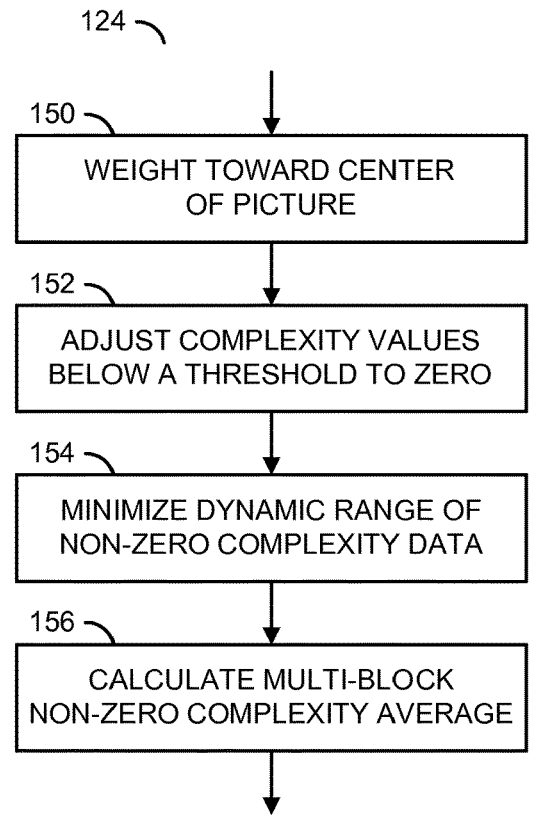
FIG. 6 is a detailed flow diagram of an example implementation of a block complexity estimation step.

Referring to FIG. 6, a detailed flow diagram of an example implementation of the block complexity estimation step 124 is shown. The step 124 generally comprises a step (or state) 150, a step (or state) 152, a step (or state) 154 and a step (or state) 156. The steps 152-156 may represent modules and/or blocks that may be implemented as hardware, software, a combination of hardware and software, or other implementations.

While performing the discrimination operation in the step 124, a weighting toward the center of the picture may be applied in the step 150. Viewer attention is usually more concentrated on the center of the pictures. In some cases, a two-dimensional linear function may be used to adjust (or weight) the complexity values by (i) approximately 50 percent to 75 percent on and near the outer edges of the pictures to (ii) approximately 125 percent to 150 percent closer to the center of the pictures.

After the complexity values have been weighted, the circuit 100 (e.g., the circuit 102a) may further adjust the complexity values. In the step 152, the complexity values below the discrimination threshold may be set to a default value (e.g., a zero value). The default complexity values may be used as the marks to indicate that the corresponding blocks are not candidates for inclusion in the initial ROI. The complexity values above the discrimination threshold may remain unaltered in the step 152. The non-default complexity values may be used as the marks to indicate that the corresponding blocks are candidates for the initial ROI. The non-zero complexity values may be referred to as ESTc values.

To reduce variations of the complexity values ESTc, step 154 may convert the complexity values ESTc to a logarithmic scale. The converted complexity values may be referred to as LogESTc values. In some embodiments, an integer logarithmic scale with the base of 2 may be implemented. Other non-linear conversions may be implemented to meet the criteria of a particular application.

In the step 156, a low pass spatial filter operation may be applied to all of the complexity values LogESTc to help find one or more groups of blocks having the high complexity values. The filtered complexity values may be referred to as avgLogESTc values. The spatial filter may operate on regions covering N×M blocks. For a picture size of 720 progressive lines (e.g., 1280×720 pixels) the value of N may range from approximately 12 to 16 and the value M may range from approximately 6 to 8. Other values of N and M may be implemented to meet the criteria of a particular application.

Figure 7:
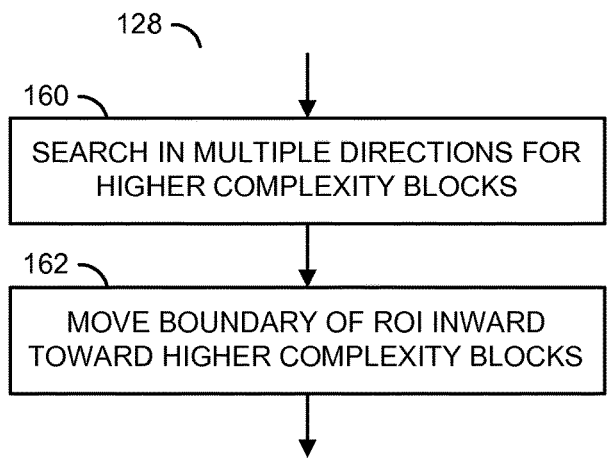
FIG. 7 is a detailed flow diagram of an example implementation of a higher complexity detection step.

Referring to FIG. 7, a detailed flow diagram of an example implementation of the higher complexity detection step 128 is shown. The step 128 generally comprises a step (or state) 160 and a step (or state) 162. The steps 160-162 may represent modules and/or blocks that may be implemented as hardware, software, a combination of hardware and software, or other implementations.

The step 128 may adjust the initial ROI (e.g., the ROI 142) generated in the step 126 to create the adjusted ROI (e.g., the ROI 144). The adjustment generally includes searching in multiple (e.g., up to four) directions (e.g., left, right, up and/or down) starting from an outer boundary (or edges) of the initial ROI. Each search seeks one or more blocks within the initial ROI that have even higher complexity values compared with the complexity values of the blocks from just outside the boundary in the search direction.

Grouping of the blocks may create the initial ROI without gaps. However, the initial ROI may include some non-high complexity blocks. Running the higher complexity detection ROI adjustment may detect one or more higher complexity boundaries within the initial ROI. Starting from a boundary of the initial ROI and moving toward the center of the initial ROI, the complexity values of the blocks may be compared against an adjustment threshold value. The adjustment threshold may be based on a local minimum using multiple (e.g., 3) non-zero complexity values from just outside the boundary. A practical value of the adjustment threshold may be in a range of 200 percent to 400 percent of a minimum non-zero complexity value from the multiple blocks outside the ROI boundary. For example, if a left edge of the initial ROI for block row Y is between columns X and (X+1), the minimum non-zero complexity value for the neighboring blocks outside the ROI to the left of the boundary (e.g., the blocks at locations (X−2,Y), (X−1,Y), and (X,Y)) multiplied by a value in a range of 2 to 4 (e.g., 200 percent to 400 percent) may be used as the adjustment threshold. Detection of an initial block moving rightward toward the center of the initial ROI (e.g., one of the blocks at locations (X+1,Y), (X+2,Y), . . . ) with a complexity value higher than the adjustment threshold may terminate the search for the current row that began at the left border. Such an initial block may be marked as the boundary of the adjusted ROI.

In the step 162, the circuit 100 (e.g., the circuit 102a) may create the final ROI by moving the boundary of the initial ROI. The boundary may be moved inward toward the higher complexity values found in the step 160. The blocks that remain inside the moved boundary generally remain part of the adjusted ROI. The blocks that were part of the initial ROI, but no longer inside the adjusted ROI boundary may be marked as non-ROI blocks. At the end of the step 162 (end of the step 128) all blocks that are part of ROI may be marked as such, and the remaining blocks may be marked as outside.

Figure 8:
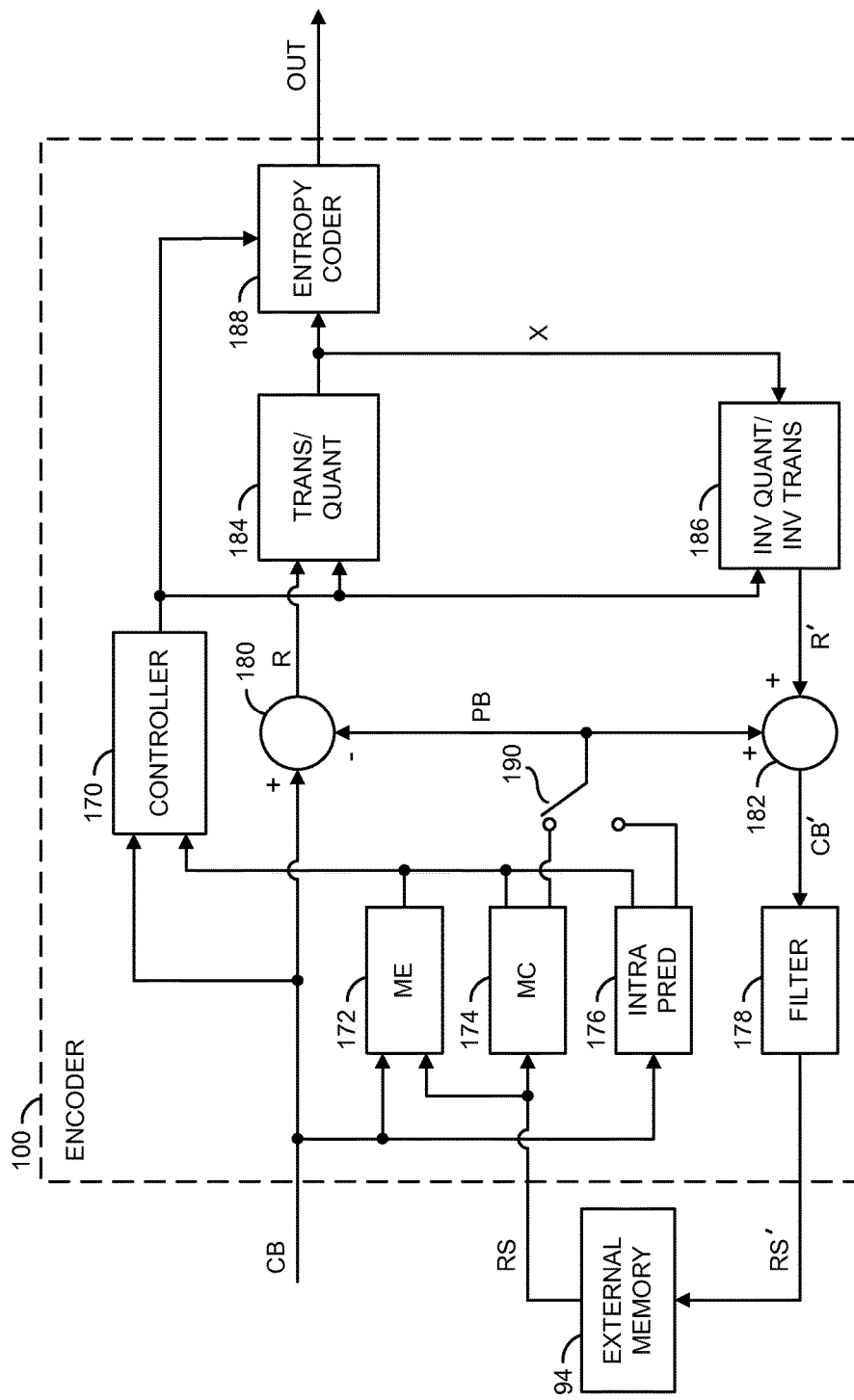
FIG. 8 is a functional block diagram of a video digital signal processor.

Referring to FIG. 8, a functional block diagram of the circuit 100 is shown. The encoder circuit 100 generally comprises a controller step (or function) 170, a motion estimation (e.g., ME) step (or function) 172, a motion compensation (e.g., MC) step (or function) 174, an intra-prediction step (or function) 176, a filter step (or function) 178, an adder step (or function) 180, another adder step (or function) 182, a transform/quantization step (or function) 184, an inverse quantize/inverse transform step (or function) 186, an entropy coder step (or function) 188 and a switch step (or function) 190. The circuit 100 may implement a hybrid video codec. The steps 170-190 may be implemented as hardware, software or a combination of hardware and software.

A signal (e.g., CB) may be received by the controller step 170, the ME step 172, the intra-prediction step 176 and the adder step 180. The signal CB may carry a current block from the signal IN that is being compressed and encoded. The signal OUT may be generated by the entropy coder step 188. The MC step 174 and the ME step 172 may receive reference picture data from the memory circuit 94 in a signal (e.g., RS). The filter step 178 may generate and transfer new reference pictures to the memory circuit 94 in a signal (e.g., RS'). A residual signal (e.g., R) may be generated by the adder step 180 and transferred to the transform/quantization step 184. The signal R may convey residual information produced by subtracting picture blocks from prediction blocks. The transform/quantization step 184 may generate and transfer a signal (e.g., X) to the entropy coder step 188 and the inverse quantization/inverse transform step 186. The signal X may carry the transformed and quantized data representative of the residual blocks. A residual signal (e.g., R') may be generated by the inverse quantize/inverse transform step 186 and presented to the adder step 182. The signal R' may carry reconstructed residual information. A prediction signal (e.g., PB) may be generated by the MC step 174 or the intra-prediction step 176, depending on the encoding mode. The signal PB generally carries the prediction blocks used by the adder steps 180 and 182. The signal PB may be routed from one of the steps 174 or 176 to the adder steps 180 and 182 by the switch step 190. A reconstructed signal (e.g., CB') may be generated by the step 182 and transferred to the step 178. The signal CB' may convey reconstructed blocks, similar to the blocks received in the signal CB. A reference signal (e.g., RS') may be generated by the step 178 and transferred to the circuit 94. The signal RS' may carry reconstructed reference blocks used to create the reference pictures.

The control step 170 may implement an encoding control function. The step 170 is generally operational to control coding of the video signal. The controller step 170 may implement the method 120. The video signal generally comprises multiple interlaced fields and/or multiple progressive frames.

The ME step 172 may implement a motion estimation function. The step 172 is generally operational to estimate a motion between a current block of a current picture (or field or frame) and a closest matching block in a reference picture (or field or frame). The estimated motion may be expressed as a motion vector that points from the current block to the closest matching reference block. The reference picture may be earlier or later in time than the current picture. The reference picture may be spaced one or more temporal inter-picture distances from the current picture. Each pixel of a picture may be considered to have a luminance (sometimes called "luma" for short) value (or sample) and two chrominance (sometimes called "chroma" for short) values (or samples). The motion estimation is generally performed using the luminance samples.

The MC step 174 may implement a motion compensation function. The step 174 is generally operational to calculate a motion compensated (or predicted) block based on the reference samples received in the signal RS and a motion vector received from the step 172. Calculation of the motion compensated block generally involves grouping a block of reference samples around the motion vector where the motion vector has integer-pet (or pixel or sample) dimensions. Where the motion vector has sub-pel dimensions, the motion compensation generally involves calculating interpolated reference samples at sub-pel locations between the integer-pel locations. The sub-pel locations may include, but are not limited to, half-pel locations, quarter-pel locations and eighth-pel locations. The motion compensated block may be presented in the signal PB.

The intra-prediction step 176 may implement an inter-prediction function. The step 176 is generally operational to calculate intra-predicted blocks from other blocks internal to the current picture. The intra-predicted blocks may be presented in the signal PB.

The filter step 178 may implement a spatial filter function. The step 178 is generally operational to spatially filter the reconstructed blocks received in the signal CB'. The filter blocks may be presented as new reference blocks to the circuit 94 in the signal RS'.

The adder step 180 may implement an addition function. The step 180 is generally operational to create residual blocks by adding an inverse of (or subtracting) the motion compensated blocks from the current blocks. The differences may be calculated on a sample-by-sample basis where each sample in a motion compensated block is subtracted from a respective current sample in a current block to calculate a respective residual sample (or element) in a residual block. The residual blocks may be presented in the signal R.

The adder step 182 may implement an adder function. The step 182 may be operational to add the reconstructed residual samples received via the signal R' to the predicted samples received via the signal PB to generate reconstructed current samples. The reconstructed current samples may be presented in the signal CB' to the filter step 178.

The transform step 184 may implement transformation and quantization functions. The step 184 is generally operational to transform the residual samples in the residual blocks into transform coefficients. The step 184 may also be operational to quantize the transform coefficients. The resulting coefficients may be presented in the signal X to the step 188 and the step 186.

The inverse quantization/inverse transform step 186 may implement inverse quantization and inverse transformation functions. The step 186 is generally operational to inverse quantize the coefficients received in the signal X to calculate reconstructed transform coefficients. The step 186 may also be operational to inverse transform the reconstructed transform coefficients to calculate reconstructed residual samples. The step 186 may reverse the quantization and transformation functions performed by the step 184. The reconstructed residual samples may be transferred to the step 182 in the signal R'.

The entropy coder step 188 may implement an entropy encoder function. The step 188 is generally operational to entropy encode a string of reordered symbols and syntax elements that represent the resulting quantized transform coefficients, motion vectors, encoding modes and other data. The encoded information may be presented in the signal OUT.

The switch step 190 may implement a switching function. The step 190 may be operational to route the predicted blocks from the step 176 while the step 170 has selected intra-prediction. The step 190 may also be operational to route the motion compensated prediction blocks from the step 174 while the step 170 has selected inter-prediction.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer)

processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMS (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. A video encoding apparatus comprising: a processor to:
receive a video signal;
compress a current picture in the video signal;
calculate a plurality of complexity values for all blocks of said current picture, wherein each of said complexity values characterizes how a corresponding one of a plurality of blocks in said current picture was compressed;
identify one or more of the blocks that have complexity values satisfying a discrimination threshold as candidate blocks associated with said current picture, wherein the discrimination threshold is based on at least one of an average of the plurality of complexity values, or a function of a maximum of the complexity values;
identify one or more of the candidate blocks that have complexity values satisfying a decision threshold as included within an initial ROI, wherein the decision threshold is based on an average of the complexity values of only the candidate blocks;
move a boundary of the initial ROI toward blocks with complexity values satisfying an adjustment threshold to define a final ROI, wherein the adjustment threshold is based on a local minimum of complexity values from one or more of the candidate blocks adjacent to a boundary of the initial ROI and excluded from the initial ROI;
superimpose said final ROI on a next picture in said video signal; and
compress said next picture with a higher bit rate inside said final ROI than outside said final ROI.

2. The apparatus according to claim 1, wherein said processor is further to:
weight the plurality of complexity values toward a center of said current picture, and then identify the one or more blocks as candidate blocks based on the weighted complexity values and the discrimination threshold; or
reduce a dynamic range of the candidate block complexity values by applying a logarithmic function to the candidate block complexity values.

3. The apparatus according to claim 1, wherein said processor is further to;
determine the discrimination threshold based on at least one of the average of the plurality of complexity values, or the function of a maximum of the complexity values;
determine the decision threshold based on the average of the candidate block complexity values; and
determine the adjustment threshold based on the local minimum of complexity values from the candidate blocks adjacent to the initial ROI boundary.

4. The apparatus according to claim 1, wherein said processor is further to expand said initial ROI to include QxP adjacent blocks around each of the candidate blocks satisfying the decision threshold, wherein Q and P range from 2 to 4 adjacent blocks.

5. The apparatus according to claim 1, wherein said processor is further to search in a plurality of directions from the boundary of the initial ROI to find one or more high complexity values within the initial ROI; and terminate the search of a current row of blocks in response to finding a high complexity block satisfying the adjustment threshold.

6. The apparatus according to claim 5, wherein said processor is further to move the boundary to the high complexity block satisfying the adjustment threshold to define the final ROI.

7. A method of video encoding, comprising:

receiving a video signal;

compressing a current picture in the video signal;

calculating a plurality of complexity values for all blocks of said current picture, wherein each of said complexity values characterizes how a corresponding one of a plurality of blocks in said current picture was compressed;

identifying one or more of the blocks that have complexity values satisfying a discrimination threshold as candidate blocks associated with said current picture, wherein the discrimination threshold is based on at least one of an average of the plurality of complexity values, or a function of a maximum of the complexity values;

identifying one or more of the candidate blocks that have complexity values satisfying a decision threshold as included within an initial ROI, wherein the decision threshold is based on an average of the complexity values of only the candidate blocks;

moving a boundary of the initial ROI toward blocks with complexity values satisfying an adjustment threshold to define a final ROI, wherein the adjustment threshold is based on a local minimum of complexity values from one or more of the candidate blocks adjacent to a boundary of the initial ROI and excluded from the initial ROI;

superimposing the final ROI on a next picture in said video signal; and compressing said next picture with a higher bit rate inside said final ROI than outside said final ROI.

8. The method of claim 7, further comprising:

weighting the plurality of complexity values toward a center of said current picture, and then identify the one or more blocks as candidate blocks based on the weighted complexity values and the discrimination threshold; or reducing a dynamic range of the candidate block complexity values by applying a logarithmic function to the candidate block complexity values.

9. The method of claim 7, further comprising:

determining the discrimination threshold based on at least one of the average of the plurality of complexity values, or the function of a maximum of the complexity values;

determining the decision threshold based on the average of the candidate block complexity values; and determine the adjustment threshold based on the local minimum of complexity values from the candidate blocks adjacent to the initial ROI boundary.

10. The method of claim 7, further comprising:

expanding said initial ROI to include QxP adjacent blocks around each of the candidate blocks satisfying the decision threshold, wherein Q and P each range from 2 to 4 adjacent blocks.

11. The method of claim 7, further comprising:

searching in a plurality of directions from the boundary of the initial ROI to find one or more high complexity values within the initial ROI; and terminating the search of a current row of blocks in response to finding a high complexity block satisfying the adjustment threshold.

12. The method of claim 11, further comprising:

moving the boundary to the high complexity block satisfying the adjustment threshold to define the final ROI.

13. A non-transitory computer readable media, with instructions stored thereon, which when executed by a processor, cause the processor to perform a method comprising:

receiving a video signal;

compressing a current picture in the video signal;

calculating a plurality of complexity values for all blocks of said current picture, wherein each of said complexity values characterizes how a corresponding one of a plurality of blocks in said current picture was compressed;

identifying one or more of the blocks that have complexity values satisfying a discrimination threshold as candidate blocks associated with said current picture, wherein the discrimination threshold is based on at least one of an average of the plurality of complexity values, or a function of a maximum of the complexity values;

identifying one or more of the candidate blocks that have complexity values satisfying a decision threshold as included within an initial ROI, wherein the decision threshold is based on an average of the complexity values of only the candidate blocks;

moving a boundary of the initial ROI toward blocks with complexity values satisfying an adjustment threshold to define a final ROI, wherein the adjustment threshold is based on a local minimum of complexity values from one or more of the candidate blocks adjacent to a boundary of the initial ROI and excluded from the initial ROI;

superimposing the final ROI on a next picture in said video signal; and compressing said next picture with a higher bit rate inside said final ROI than outside said final ROI.

14. The apparatus according to claim 1, wherein:

the adjustment threshold is 200-400% of a minimum complexity value for candidate blocks to the left, right, above, or below the initial ROI boundary; and the processor is to search in multiple directions, starting at the boundary of the initial ROI and moving toward the center of the initial ROI, for one or more blocks within the initial ROI that have higher complexity values than the adjustment threshold.

15. The apparatus according to claim 1, wherein the discrimination threshold is a function of a maximum complexity value divided by a number between approximately 3 and 5.

16. The method of claim 7, wherein:

the adjustment threshold is 200-400% of a minimum complexity value for candidate blocks to the left, right, above, or below the initial ROI boundary; and moving the boundary further comprises searching in multiple directions, starting at the boundary of the initial ROI and moving toward the center of the initial ROI, for one or more blocks within the initial ROI that have higher complexity values than the adjustment threshold.

17. The method of claim 7, wherein, wherein the discrimination threshold is a function of the maximum complexity value divided by a number between approximately 3 and 5.

* * * * *